(12) United States Patent
Ben Rhouma et al.

(10) Patent No.: US 7,156,420 B2
(45) Date of Patent: Jan. 2, 2007

(54) STEERING MECHANISM INCLUDING CONTROLLABLE IMPACT ENERGY ABSORBING MEANS

(75) Inventors: Abdel Karim Ben Rhouma, Vendome (FR); André Laisement, La Chapelle Encherie (FR); Vincent Eymery, Vendome (FR)

(73) Assignee: Nacam S.A., Vendome (FR)

( * ) Notice: Subject to any disclaimer, the term of this patent is extended or adjusted under 35 U.S.C. 154(b) by 307 days.

(21) Appl. No.: 10/886,653

(22) Filed: Jul. 9, 2004

(65) Prior Publication Data

US 2005/0012316 A1 Jan. 20, 2005

(30) Foreign Application Priority Data

Jul. 10, 2003 (FR) .................................. 03 08431

(51) Int. Cl.
*B62D 1/11* (2006.01)
(52) U.S. Cl. ..................................... 280/777
(58) Field of Classification Search ................ 280/777, 280/775; 74/492, 493
See application file for complete search history.

(56) References Cited

U.S. PATENT DOCUMENTS

| | | | | |
|---|---|---|---|---|
| 5,605,352 A | * | 2/1997 | Riefe et al. ................. | 280/777 |
| 5,961,146 A | * | 10/1999 | Matsumoto et al. ........ | 280/777 |
| 6,322,103 B1 | * | 11/2001 | Li et al. ..................... | 280/777 |
| 6,575,497 B1 | * | 6/2003 | McCarthy et al. .......... | 280/777 |
| 6,799,486 B1 | * | 10/2004 | Manwaring et al. ......... | 74/493 |

FOREIGN PATENT DOCUMENTS

| | | |
|---|---|---|
| EP | 11 80 467 A | 2/2002 |
| EP | 12 47 721 A | 10/2002 |
| FR | 27 75 648 A | 9/1999 |
| FR | 27 88 029 A | 7/2000 |
| WO | WO 76 833 A | 12/2000 |

* cited by examiner

*Primary Examiner*—Faye M. Fleming
(74) *Attorney, Agent, or Firm*—Lawrence E. Laubscher, Sr.; Lawrence E. Laubscher, Jr.

(57) ABSTRACT

An energy absorbing mechanism for collapsible vehicle steering column includes a deformable wire connected between the fixed and movable column members. The wire includes a straight portion connected at one end with the movable column member, and a second portion that is deformed around a cylinder that is secured to the fixed column member. A force generator is operable upon impact to apply laterally to the wire a controlled frictional force that is a function of various physical properties of the driver, the vehicle, or the environment, thereby to afford infinitely variable and modulatable energy absorption.

17 Claims, 6 Drawing Sheets

STEERING MECHANISM INCLUDING CONTROLLABLE IMPACT ENERGY ABSORBING MEANS

BACKGROUND OF THE INVENTION

1. Field of the Invention

A vehicle steering mechanism includes a wire device connected between fixed and movable column members for absorbing the energy forces applied thereto upon impact, and force generating means for varying the frictional resistance developed by the wire as a result of the physical properties of the driver, the vehicle, and/or the environment of vehicle use.

2. Description of the Related Art

This invention relates to an infinitely modulatable energy absorption device for an automotive vehicle steering column, which absorption device is operable axially of the direction of collapse of the steering column.

The device according to the invention is used especially on a steering column that can be adjusted in terms of depth and/or inclination, which steering shaft is mounted in a tubular body that is supported and locked on the vehicle chassis at the desired position. The steering column comprises a steering shaft that is mounted so that it can rotate in the tubular body, which body is linked to a support assembly attached upon the vehicle chassis or upon an element of the car body. The invention can also be used for an nonadjustable steering column; in this case, the tubular body is mounted directly in the support assembly.

During impact of the vehicle, a portion of the impact energy of the driver upon the steering wheel is absorbed by the steering column. The latter, in general, comprises systems that make it possible to cushion the movement of the driver at the moment of impact upon the steering wheel. The systems that are currently installed on mass-produced vehicles will react according to inflexible pre-established rules, regardless of the conditions involved in the impact.

In reality, the amount of energy necessary to brake the momentum of the driver in case of impact will depend on several parameters, such as the speed of the vehicle, the weight of the driver, the wearing of a seat belt, and the like, which are not taken into account by the energy absorption systems of the prior art.

These systems penalize certain categories of drivers who are not included in the average population for which the energy absorption element upon the steering column was calibrated. These categories generally are persons of small size, and persons of very large size. As a matter of fact, a small-framed person meeting a rigid obstacle often results in the risk of inflicting bodily damage upon said person, and a large-framed person is not sufficiently slowed down and faces the risk of suffering damage due to an excessive acceleration of his body during the crash.

Systems that take into account certain parameters, such as the wearing of the seatbelt or the weight of the driver, have been proposed by the applicant and are covered in French Patents Nos. 99-00169, 99-14813, and 00-09815. These concepts make it possible to have a discrete number of rules as a function of the number of elements of energy absorption present on the steering column.

This improves the absorption of the energy, but does not cover all impact situations where certain parameters are specific to each accident case, such as the speed of the vehicle before the impact.

BRIEF SUMMARY OF THE INVENTION

The primary object of the present invention is to provide an energy absorption system that is directed along the direction of collapse on of the steering column, said system being infinitely modulatable or controllable so as to cope with all impact situations and to be able to protect all categories of drivers, especially those that are not within the average type of driver, while being easily installed within the space taken up by the existing steering columns.

According to a more specific object of the invention, a device for the absorption of energy of an automotive vehicle steering column is provided including a single metallic wire and a force generator. The single metallic wire includes a first generally straight portion whose end is connected to the mobile support element and whose other end is extended by a second portion that is applied against a cylinder linked to the fixed support element, whereby the wire second portion is deformed in a semicircular manner and is extended by a third wire portion whose end is free.

The force generating means is connected with the fixed support element and is arranged on one side of the portion of the wire concerned. This force generator can supply a variable force so as to deform the metallic wire along a direction transverse to said wire apart from the second portion, which has a semicircular shape.

The force generating means operates on the wire between two fixed support elements connected with the fixed support element and arranged on the other side of the wire portion concerned, thereby to provide an infinitely modulatable energy absorption device that will adapt to each impact situation.

According to another object of the invention, the force generating means can work either on the third portion of the metallic wire, which is essentially straight, or on the first portion of the metallic wire. In this latter case, the third portion of the metallic wire can be essentially straight or it can be rolled up around the roller.

In these different embodiments, the force generating means operates on a portion of the wire arranged between two independent support elements, between one independent support element and a support element that is integrated into the cylinder, or between an independent support element and a support element made up of the cylinder.

In the preferred architecture of the invention, the fixed support element comprises a base having two essentially vertical side walls linked by a connection element that is essentially parallel to the base. These side walls are arranged and guided in case of an impact between the two walls of the fixed support element.

All walls are oriented along the longitudinal direction of displacement of the movable support element in case of an impact. Moreover, an oblong guidance hole is contained in the base and extends generally parallel to the side walls, and has a length that will permit the displacement of the mobile support element.

A metallic-wire hitching element is attached to the movable column member and extends through a guide slot guidance hole so as to be linked to the end of the first portion of the metallic wire. This hitching element is arranged to slide in the oblong guide slot. The cylinder is attached upon the base, and each independent support element is also mounted on the base.

More specifically, in this construction, each side wall of the fixed support element includes a lateral wing equipped with a fastening hole. Each wall of the movable column element comprises a lateral element with an oblong outlet hole, which is applied against the lateral element and the corresponding mounting hole of the fixed support element, the two mounting holes and the two oblong holes receiving a fastening element of the vehicle structure.

The fixed column element and the movable column element are linked by a friction control assembly, which comprises a pair of synthetic plastic washers and a metallic washer. The first synthetic plastic washer, arranged between the base and the connection element, receives a cylindrical sleeve portion of the second synthetic plastic washer arranged on the other side of the base. The cylindrical sleeve extends through and slides within the oblong guide hole. The metallic washer is placed on the second plastic washer. A fastening element connects the metallic washer to the connecting element so that one can bring about the desired tightening so as to make it possible for the mobile support element to slide in case of impact.

In this structure of the invention, the cylindrical support member can be arranged to the left or the right of the axis of the oblong guidance hole.

The end of the first portion of the wire is so shaped as to define a hook or loop that completely surrounds the hitching element; the axial length of the hook housing is greater than the axial length of the hitching element, thereby to provide a delay in the action of the energy absorption device in case of impact.

Each independent support element is a small cylinder that is surrounded by a plastic sleeve and is mounted on an axis fixed upon the base; the cylinder is concentrically surrounded by a synthetic plastic sleeve and comprises a centering pin.

According to the invention, the impact absorbing device further includes a cover plate which consists of a base that covers the metallic wire and the base of the fixed support element, as well as two orthogonally arranged walls that surround the walls of the fixed support element. Each wall is equipped with a lateral wing element that is applied against a corresponding lateral element of the fixed support element. Each group of two lateral elements is each equipped with a fixation hole receiving a fixation element in the vehicle structure. The cover plate is mounted in place by the centering pin and by the axis or axes of the small support cylinder, and is fixed upon the base by the mounting screw of the cylinder.

In order to guide the metallic wire, said metallic wire slides against a friction element which is hooked onto one of the two walls of the cover plate.

The infinitely modulable energy absorption device of the steering column according to the present invention offers the advantage of having a structure based on a single metallic wire, which is very simple to produce and install in the automotive industry. Moreover, the device is particularly small and can be easily arranged between the fixed support element and the movable element. The device is also very flexible because it is possible to provide the position of the force generator that is most adapted to the architecture of the vehicle and the force generator can be of any type. Finally, since the energy absorption device is infinitely controllable and modulatable, it may be suitable for all types of impacts and all categories of drivers, regardless of their weight and size.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

Figure 1:
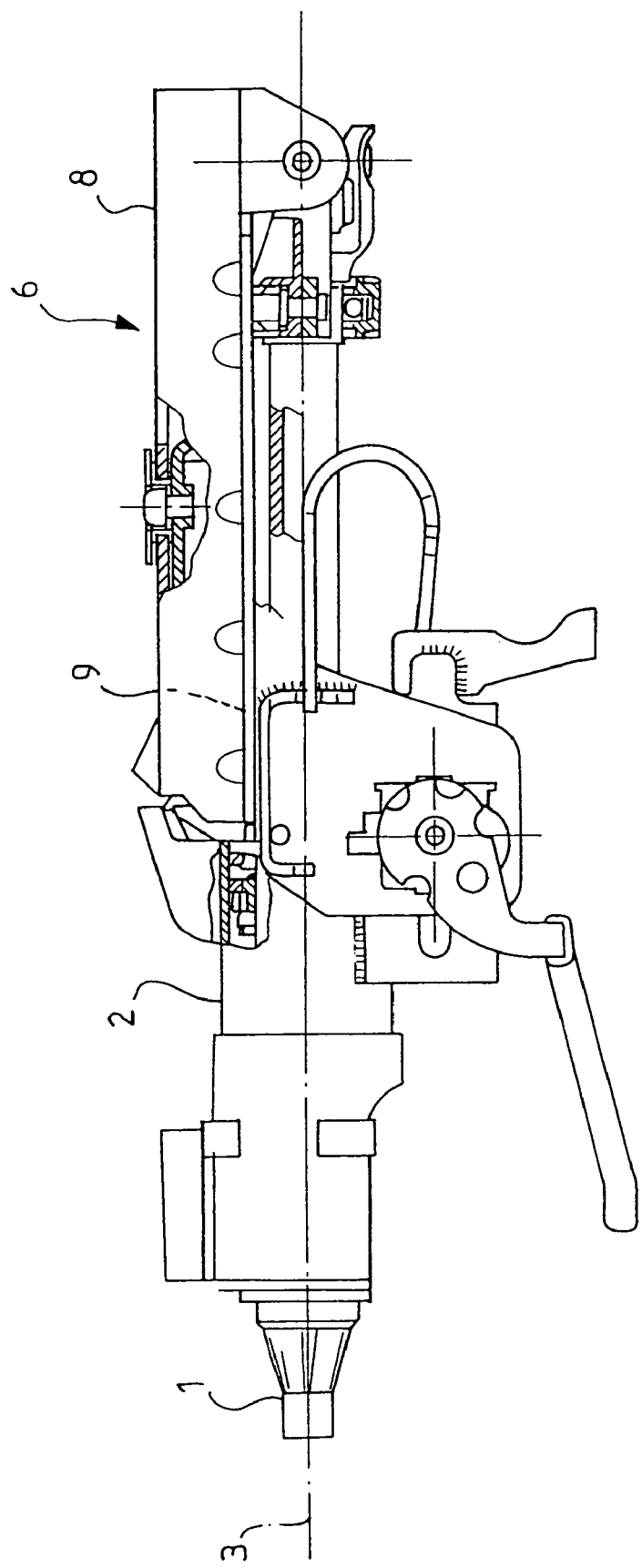
FIG. 1 is a side elevation view of a vehicle steering mechanism including the impact energy absorbing means of the present invention.

Referring first more particularly to FIG. 1, the steering column of the present invention includes a steering shaft 1 that is rotatably supported in the tubular body 2 for connection with the vehicle steering wheel, not shown, which steering shaft has a steering axis 3. The steering column support means 6 includes a fixed support member 8 that is connected to the vehicle chassis, and a movable support member 9 that is axially displaceable in a longitudinal direction relative to the fixed support member 8.

Figure 2:
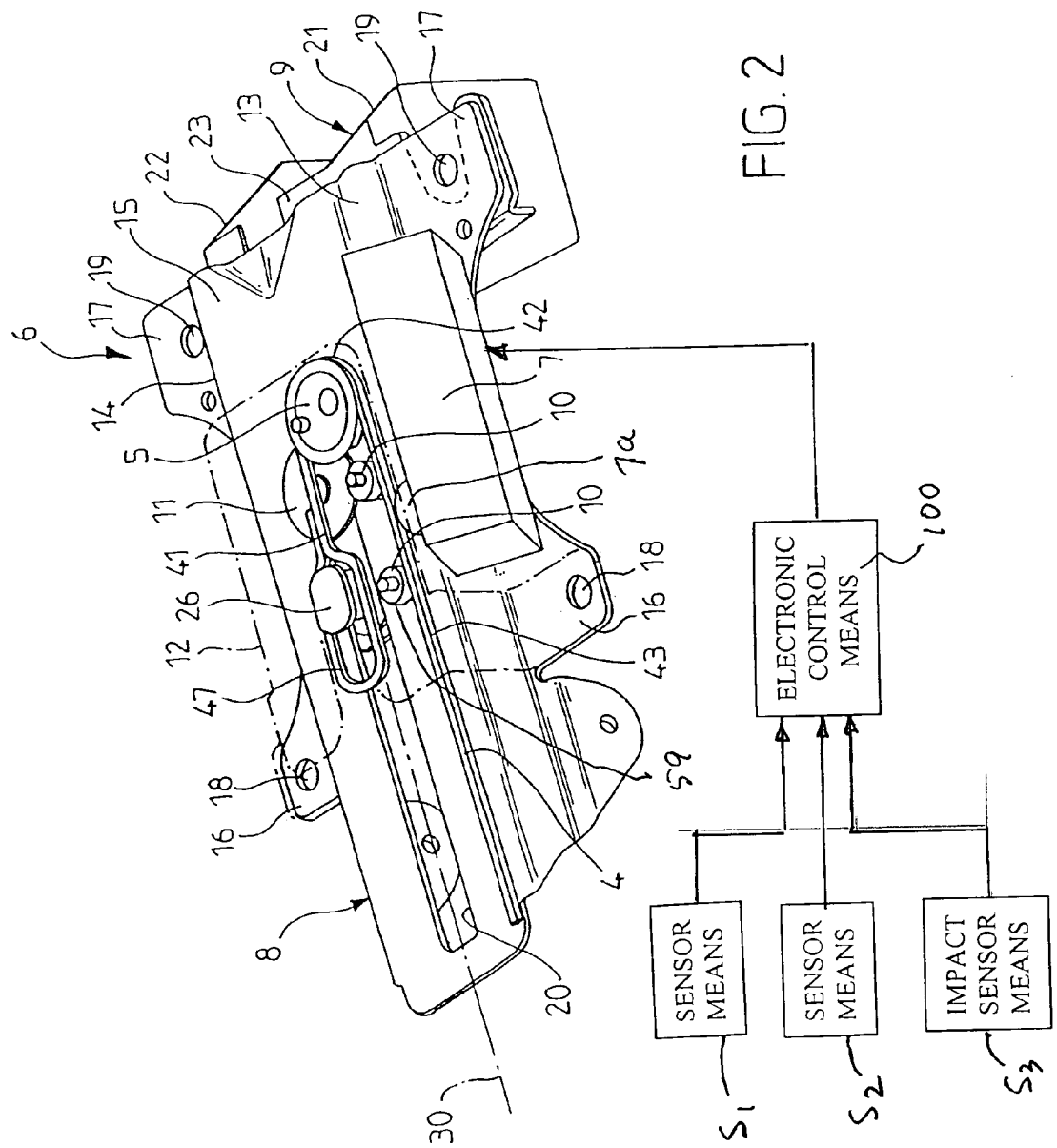
FIG. 2 is a perspective view of the impact energy absorbing means with the cover element removed.
Figure 3:
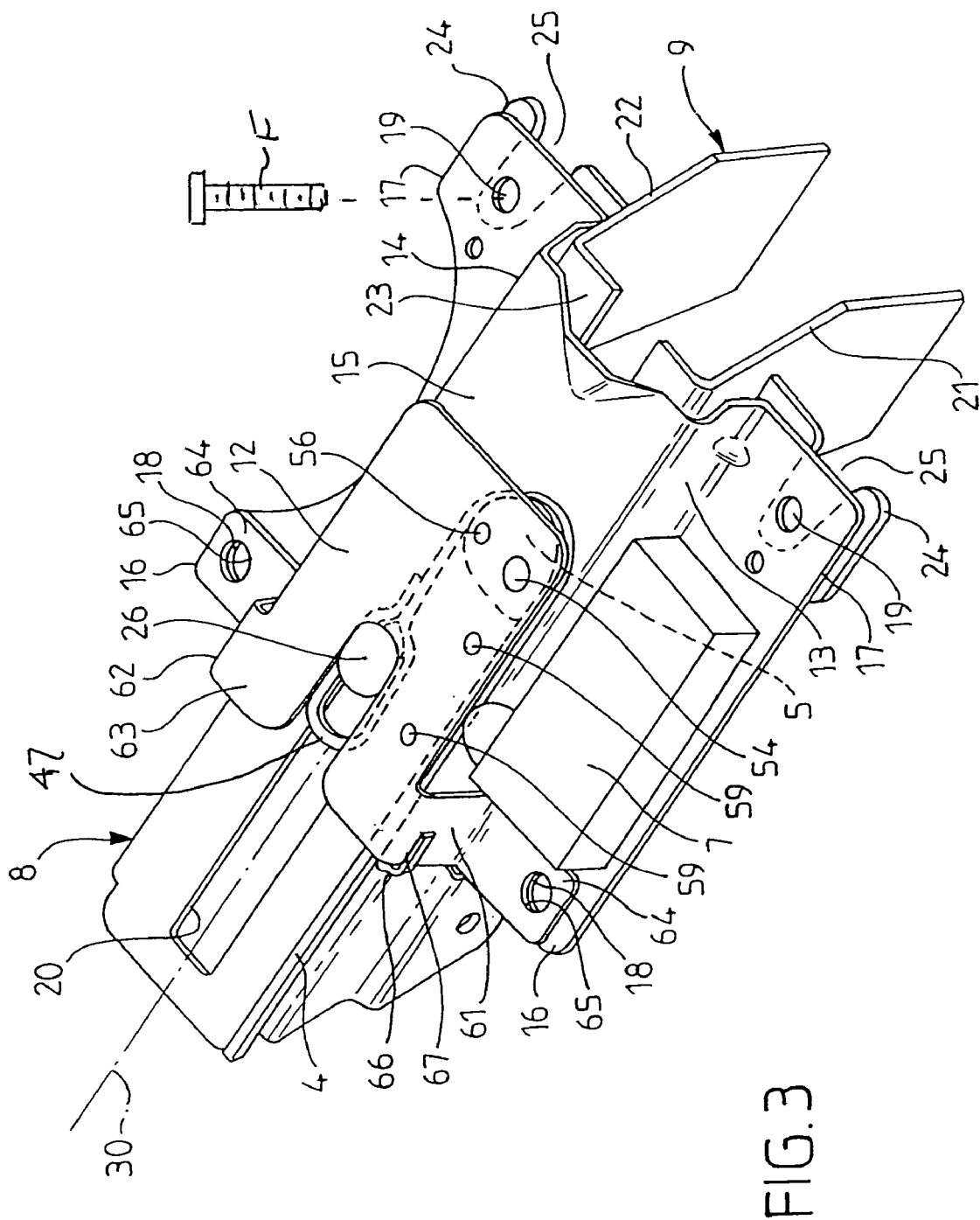
FIG. 3 is a right hand perspective view of the apparatus of FIG. 2, with the cover element in place.
Figure 5:
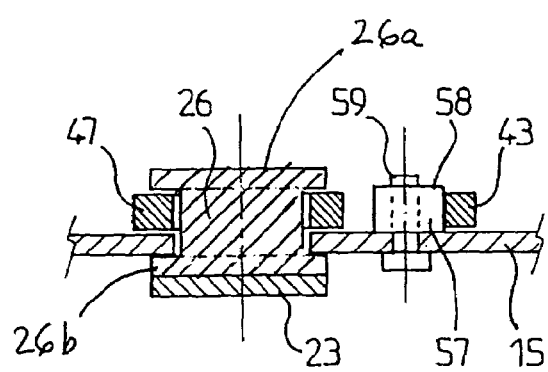
FIGS. 5 and 6 are sectional views taken along lines V—V and VI—VI of FIG. 4, respectively.

Referring now to FIG. 2, the controllable impact energy absorbing means of the present invention includes a fixed column member 8 that is adapted for fastening to the vehicle chassis, and a movable column member 9 that is connected for longitudinal axial displacement relative to the fixed column member 8. More particularly, the column member 8 includes a flat base portion 15 having a pair of downwardly extending parallel side walls 13 and 14 that terminate at their lower ends in laterally outwardly extending wing portions 16 and 17 that contain mounting holes 18 and 19, respectively. As shown in FIG. 3, the movable column member 9 includes a horizontal base plate 23, and a pair of downwardly extending side wall portions 21 and 22 that are arranged parallel with and adjacent the inner surfaces of the side walls 13 and 14 of the stationery column member 9. The side walls 21 and 22 terminate in outwardly extending wing portions 24 that extend beneath the wing portions 17 of the stationery column member 8. The wing portions 24 contain longitudinal slots 25 that extend beneath the fastening openings 19, thereby to permit longitudinal displacement of the movable column member 9 relative to the fixed column member 8. The base portion 15 of the fixed column member 8 contains a longitudinally extending opening 20 that receives a hitching post 26 that is secured at its lower end to the base portion 23 of the movable column element 9, as best shown in FIG. 5. The movable post 26 includes an enlarged upper head portion 26a, and an enlarged lower head portion 26b that is secured to the base portion 23 of the movable column member 9.

In accordance with a characterizing feature of the invention, a deformable metal wire member 4 is provided having a straight first portion 41 that extends parallel with the longitudinal axis 30 of the opening 20, a semicircular second portion 42, and a third portion 43 that is linear and generally parallel with the first portion 41. The semicircular second portion 42 is deformed around a stationary cylinder 5 that is fastened to the base portion 15 of the stationary column member 8. The free end of the first wire portion 41 is looped or deformed to define a hook or loop 47 that encloses the post 26, thereby to provide a limited amount of longitudinal play between the post 26 and the wire 41, as will be described in greater detail below. The fixed support member 5 comprises a cylinder having a centering pin 56 that extends upwardly into a corresponding opening contained in the base portion 63 of a cover member 12, as best shown in FIGS. 2 and 3. The cover member 12 includes a pair of orthogonally arranged side wall 61 and 62 that extend downwardly adjacent the outer surfaces of the side walls 13 and 14, respectively, of the stationery column member 8. A fastening member 54 extends downwardly through the corresponding openings in the cover plate 12 and the cylinder member 5 into threaded engagement with the stationary base portion 53.

Mounted on the lateral flange portion 17 of the fixed column member 8 is a force generating means 7 including an operating member 7a that is arranged to engage a lateral surface of the impact-restraining wire 4. The force generating means 7 is operable in response to signals supplied by sensor means $S_1$, $S_2$, and $S_3$ via electronic control means 100. The force generating means 7 serves to provide a controllable force on the wire 4 via the operating member 7a. A plurality of sensors may be provided for supplying to the electronic control means 100 information corresponding with the physical properties of the driver, the vehicle, or the environment. The sensors may provide input signals corresponding with such parameters as the speed of the vehicle, the weight of the driver, whether or not the seat belt is fastened, the weight of the vehicle, and the like. Many types of force generating means are appropriate, such as a pyrotechnic version of the device. In the embodiment of FIG. 2, the operating member 7a of the force generating means 7 is arranged to engage the lateral surface of third wire portion 43 at a location between a pair of support means 10 that are spaced on the opposite side of the wire from the operating member 7a. The support means 10 are supported in fixed relation to the base portion of the fixed column member 8. Thus, upon an impact resulting in the actuation of the force generating means 7, the operating member 7a is extended outwardly from the housing of the force generating means 7, thereby to deform the portion of the wire between the pair of stationary supports 10, thereby to further control the resistance of the wire 4 to the displacement of the movable column member 9 from its initial first position to the second position. The support members 10 comprise a pair of cylinders each having a mounting pin 59 that extends upwardly into a corresponding centering hole contained in the cover member 12, as shown in FIG. 3. Similarly, the centering pin 56 on the first fixed support 5 extends within a corresponding centering hole contained in the cover member 12.

Figure 4:
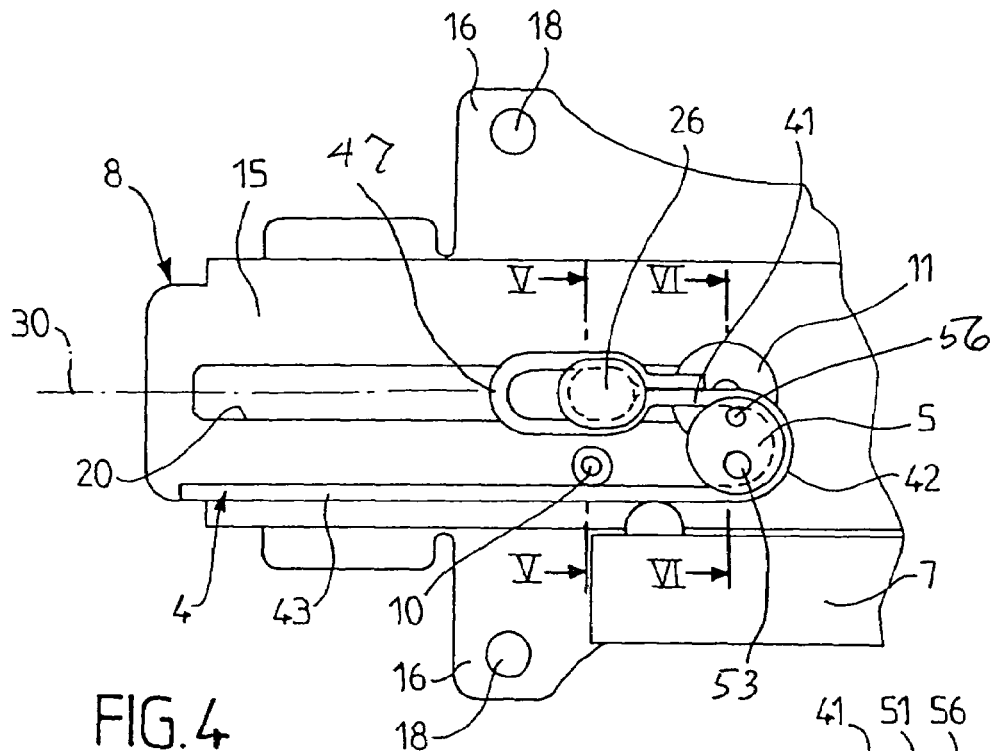
FIG. 4 is a detailed top plan view of the energy absorbing wire arrangement.

Referring to the modification of FIG. 4, only one secondary support member 10 is provided, whereby the operating member 7a of the force generating means 7 engages the second portion of the wire 43 between the fixed cylindrical elements 5 and 10 that are mounted on the base portion 15 of the fixed column member 8. In the modification shown in FIG. 4A, the cylindrical fixed support member 5 is surrounded by a tubular synthetic plastic sleeve 52 having an extension 55 that defines a support for supporting one end of the third wire portion 43 for cooperation with the operating member 7a of the force generating means 7.

As best shown in FIG. 5, the hitching post 26 has at its top and bottom ends a pair of enlarged portions 26a and 26b. The lower enlarged portion 26b is secured to the connecting portion 23 of the movable column member 9, and the enlarged top portion 26a retains in place the loop portion 47 of the first wire end 41. The second support member 10 is supported on the base portion 15 of the fixed column member 8 by the centering pin 59, whereby the circumferential surface of the second fixed support 10 supports the second wire portion 43.

Figure 6:
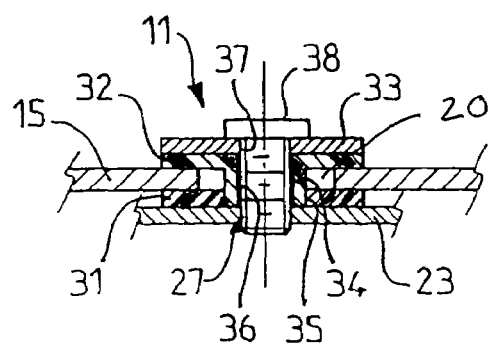

As shown in FIG. 6, connecting means 11 are provided for connecting together the movable column member 9 and the fixed column member 8 with a certain degree of controllable frictional resistance. More particularly, a threaded bore 27 is formed in the base portion 23 of the movable column member 9 opposite the oblong slot 20 contained in the base portion 15 of the fixed column member 8. A first synthetic plastic washer 31 is mounded concentrically about the threaded bore 27, and on the opposite side of the base portion 15, a second synthetic plastic washer 32 is provided. This second washer 32 has an integral sleeve portion 36 that extends downwardly through the elongated slot 20 and concentrically within the synthetic plastic washer 31. A metal washer 33 is mounted on the opposite side of the base portion 15 from the synthetic plastic washer 32. Finally, a friction-adjusting screw 38 extends downwardly through the aligned bores of the metal washer 33, the synthetic plastic washer 32 with the sleeve portion 36, the synthetic plastic washer 31, and into threaded engagement with the threaded bore 27 contained in the base portion 23 of the movable column member 9. Thus, upon tightening of the friction-adjusting screw 38, the synthetic plastic washers are compressed to a desired degree against opposite sides of the base portion 15, thereby to provide a controlled frictional resistance to movement of the movable column member 9 relative to the fixed column member 8.

Operation

In operation, assume that the impact energy absorbing apparatus is in the initial first condition illustrated in FIGS. 2 and 3. In the event of a minor jolt to the automotive vehicle, movable column 9 may be slightly shifted to the left relative to the fixed column member 8. A delay is provided by the oversized loop portion 47 at the end of the first wire portion 41, since the longitudinal dimension of the loop portion 47 is greater than the corresponding longitudinal dimension of the hitching post 26. Thus, no operation of the energy absorbing means results from this limited amount of play of the movable column member 9 relative to the fixed column member 8.

Upon the occurrence of an unacceptably large impact force to the vehicle as determined by the electronic control means 10 in response to signals provided by the various sensors $S_1$, $S_2$, and $S_3$, the force generating means 7 is operated to cause operating member 7a to be displaced outwardly from the housing of the force generating means, thereby to apply a certain amount of force upon the lateral surface of the third wire portion 43 between the pair of fixed secondary support members 10. As the movable column member 9 is displaced to the left of column member 8, the wire 4 is progressively pulled to the left by the hitching post 26 around the first fixed support cylinder 5 until the play provided by the loop 47 is taken up, whereupon the hitching post 26 is engaged by the wire 4, thereby pulling the wire relative to the first fixed support 5. During progressive movement of the movable column member 9 to the left, frictional resistance is provided on the wire by the force generating means operator 7a, and the displacement of the movable column member 9 to the left is further resisted by the frictional force generated by the adjustable connecting means 11.

The movement of the movable column member 9 to the left continues until the hitching post 26 reaches the left hand end of the slot 20. During this displacement of the movable member 9, resistance is provided by the frictional force between the wire 4 and the resistance and deformation means 7a and 10, together with the resistance provided by the adjustable connecting means 11. Furthermore, a frictional element 66 (FIG. 3) may be provided on the side wall 61 of the cover member 12 for engaging the third wire portion 43 to apply additional frictional resistance to the wire 4. In this case, as shown in FIG. 3, resistance to displacement of the movable column member 9 to the left is provided by the operating member 7a cooperating with a first portion of the wire between the fixed support cylinders 10, and by the frictional resistance element 66 supported by the cover member 12.

The cover plate 12 covers the impact energy absorbing means of the present invention, and also serves as a support or guide for the metal wire, thereby to prevent it from being deformed during impact. In a routine driving situation, the movable column member a is connected to the stationary column member 8 by means of a pair of capsules (not shown), and the third point arranged in the steering axis. A delay in that movement is made between the loop of the metal wire 4 and the movable part of the column, thereby to make it possible during impact to rupture the capsules without any additional effort by the impact resisting device. The aforementioned energy recovery capsules can be connected between the lateral element 17 of the stationary column member 8 and the associated lateral element 24 of the movable column member.

Thus, in a minor shock situation, the operating member 7a of the force generator 7 remains retracted within the housing, and no thrust effort is applied upon the metallic wire in this condition. This is also true in the case of a rather low-energy impact, which does not necessitate the functioning of the force generator 7 or also if the latter does not work. In these latter two conditions, minimum energy absorption is assured on the steering column. It is given by the rule of behavior of the metallic according to its positioning on the column.

On the other hand, during a severe impact, the electronic control unit C receives the data coming from the different sensors placed at different locations on the vehicle to measure different parameters, (vehicle speed immediately prior to impact, weight or driver, wearing seatbelt, etc.), which are necessary to calculate the rule for controlling the force generator 7. According to the command rules programmed into electronic unit, the force generator 7 exerts a more or less major lateral effort on the wire to slow down its displacement, and consequently, to adapt the quantity of energy absorbed by the steering column to the shock situation. The energy differential obtained by the thrust of the force generator 7 comes from the combination of two phenomena; namely, the deformation and friction of the wire between the operating member of the force generator 7 and the support elements 10.

The modulation of the absorption effort can then be infinitely variable as a function of the command rules programmed into the electronic unit C, which takes into account the specific values of the different parameters associated with the impact. The electronic unit C calculates the rule for the control of the force generator 7, taking into account the total retraction run that takes place on the column. The shock energy is then distributed over the entire run available on the column to reduce the level of effort applies upon the body of the driver and, consequently, to reduce the risk of injuries.

The apparatus of the present invention is very flexible and permits various types of arrangements. Thus, cylinder 5 can be arranged to the left of axis 30 of oblong guide hole 20 as shown in FIGS. 2 to 8, or cylinder 5 can be arranged to the right of axis 30 of the oblong guide hole as shown in FIGS. 9 to 12.

In the two configurations given above for cylinder 5, the force generator 7 can be applied on the third portion 43 of metallic wire 4, which is essentially straight, as in FIGS. 1 to 6 and 9 to 10.

In the two configurations of cylinder 5, force generator 7 can be applied on the first portion 41 of metallic wire 4 as shown in FIGS. 7, 7A, 8, 11 and 12.

Figure 7:
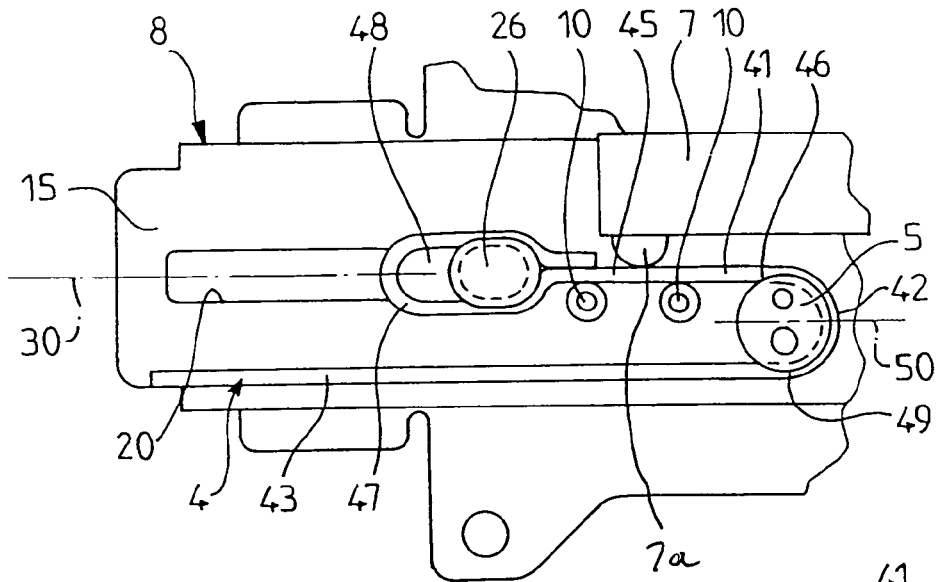
FIG. 7 is a modified version of the wire impact absorbing means.
Figure 7A:
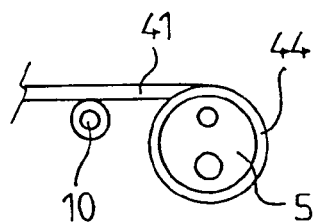
FIG. 7A is a modification of the apparatus of FIG. 7.
Figure 8:
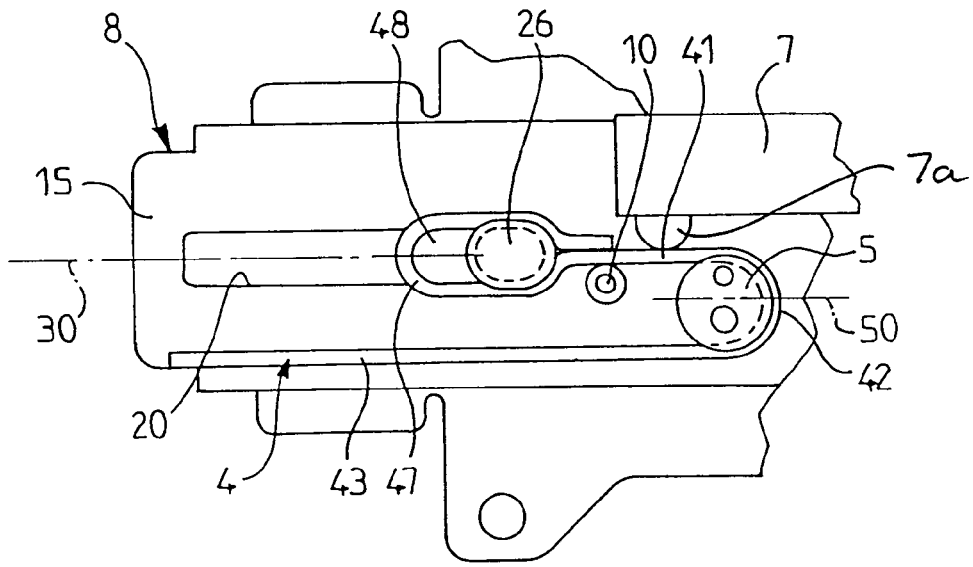
FIGS. 8–12 are modifications of the impact absorbing wire arrangement of FIG. 7.
Figure 9:
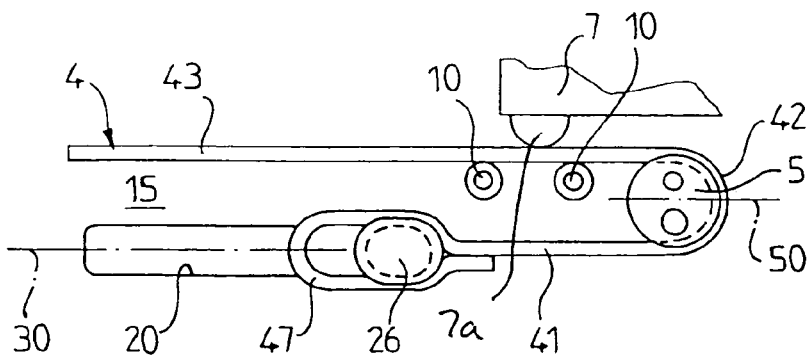
Figure 10:
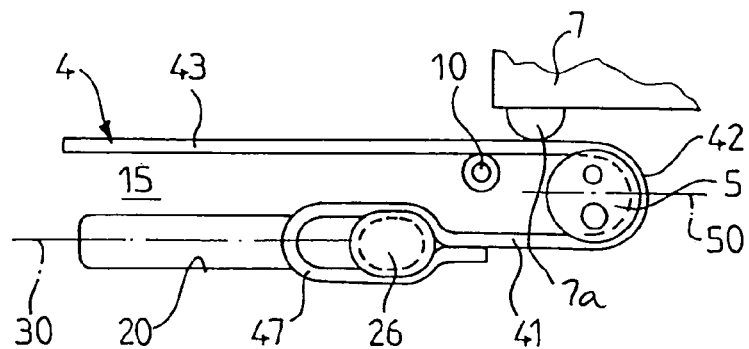
Figure 11:
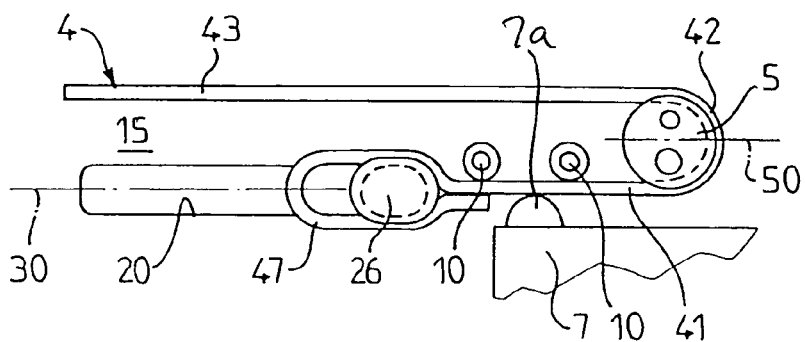
Figure 12:
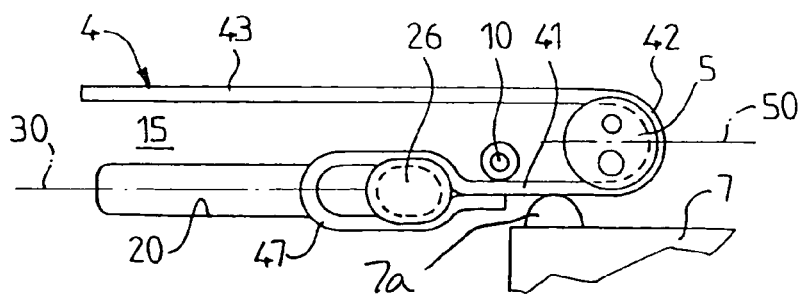

In these latter types of assembly, the third portion 43 of metallic wire 4 can be essentially straight, as is the case in FIGS. 1 to 7 and 8 to 12, or as shown in FIG. 7A, the third portion 44 of metallic wire 4 can be rolled up around cylinder 5.

Figure 4A:
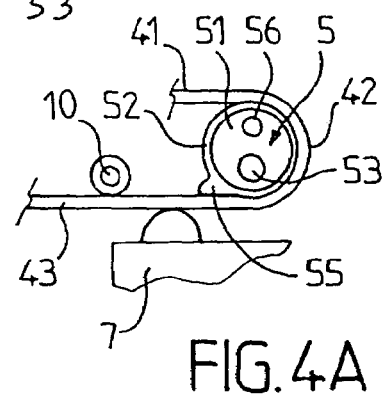
FIG. 4A is a detailed view of a modification of the impact absorbing means of FIG. 4.

There can also be various types of embodiments for the two supports 10. In a first embodiment type, the force generator 7 works between two independent support elements 10, as in FIGS. 2, 3, 7, 9, and 11. In a second embodiment, force generator 7 works between an independent support element 10 and is a support element 55 that is integrated in cylinder 5 as is shown in FIG. 4A. In a third type of embodiment, the force generator works between an independent support element 10 and a support element made up of cylinder 5 as in FIGS. 4, 7A, 8, 10, and 12.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A vehicle steering column including modulatable energy absorbing means, comprising:
  (a) a fixed column member (8) adapted for fastening to the vehicle chassis, said fixed column member having a longitudinal axis, said fixed column member having a generally U-shaped cross-section and including a base portion (15), and a pair of parallel spaced side wall portions (13, 14) extending normal to said base portion;
  (b) a movable column member (9) connected for collinear movement relative to said fixed column member from a normal first position toward a second position, said movable column member having corresponding U-shaped cross-sectional configuration including a base portion (23) and a pair of orthogonally arranged side wall portions (21, 22), said movable column member being mounted within and operable for collinear sliding movement relative to said fixed column member;
  (c) means resisting movement of said movable column member from said first position toward said second position, said movement resisting means including:
    (1) a deformable wire (4) formed of metal, said wire having first (41), second (42), and third (43) portions, said first wire portion being linear and extending parallel with said fixed member longitudinal axis;

(2) first connecting means including a hitching post (26) connected with said movable column member base portion and extending through a longitudinal opening (20) contained in said fixed column member base portion, the length of said opening corresponding with the length of travel of said movable member from said first position to said second position, said first connecting means (26, 47) connecting one end of said first wire portion with said movable column member; and (3) second connecting means connecting said wire second portion with said fixed column member, and with said first wire portion extending in the direction of travel of said movable column member from said first position to said second position, said second connecting means including a first fixed support member (5) connected with said base portion of said fixed column member, said first fixed support member including a semi-spherical surface the axis of which is contained in a plane extending normal to the longitudinal axis of said fixed column member, said second wire portion being deformed into a semi-circular configuration in engagement with said support member semi-circular surface, whereby said wire second portion cooperates with said fixed support to frictionally resist movement of said movable column member from said first position to said second position relative to said fixed column member; and (d) force generating means (7) for controlling the degree of frictional resistance of said wire to the displacement thereof relative to said fixed support, thereby to control the degree of resistance of movement of said movable member from said first position to said second position.

2. A vehicle steering column as defined in claim 1, wherein said third wire portion is generally straight and extends from said second wire portion adjacent generally parallel with and in the same direction as said first wire portion.

3. A vehicle steering column as defined in claim 1, wherein said force generating means is operable for cooperation with said first wire portion.

4. A vehicle steering column as defined in claim 3, wherein said first wire portion is straight and extends adjacent and parallel with said first wire portion.

5. A vehicle steering column, as defined in claim 3, wherein said third wire portion is coiled about said fixed support member.

6. A vehicle steering column as defined in claim 2, and further including at least one second fixed support member (10) connected with said fixed column member adjacent and on the opposite side of said wire from said force generating means.

7. A vehicle steering column as defined in claim 6, and further including means (55) defining another one of said second fixed support members in supported relation on said first support member.

8. A vehicle steering column as defined in claim 6, wherein said one second fixed support member is arranged for cooperation with a given wire portion in spaced relation relative to said first fixed support member, said force generating means being arranged for engagement with said given wire portion intermediate said first and second support members.

9. A vehicle steering column as defined in claim 1, and further including at least one second fixed support member connected with said fixed column member base portion on the opposite side of said wire from said force generating means.

10. A vehicle steering column as defined in claim 9, wherein said fixed column member side walls include at their free ends outwardly directed orthogonally arranged fastening wiring portions (17) containing fastening openings (19); wherein said movable column member side walls include outwardly directed guide wing portions (24) adjacent said fixed member fastening wing portions, said guide wing portions containing longitudinally extending slots (25) opposite said fastening openings, respectively; and further including fastening means (F) fastening said movable column wing portions for sliding movement relative to said fixed column wing portions.

11. A vehicle steering mechanism as defined in claim 9, wherein said base portion of said movable column member contains a threaded through bore (27) opposite said longitudinal opening (20); and further including:

(e) fastener means (11) connecting said movable column member for sliding movement relative to said fixed column member, said fastener means including:

(1) a synthetic plastic washer (31) arranged concentrically about said threaded through bore between said movable column member base portion and said fixed column member base portion;

(2) a second synthetic plastic washer (32) arranged concentrically about said threaded through bore on the opposite side of said fixed column member base portion from said first washer, said second synthetic washer including a tubular sleeve portion that extends downwardly into said longitudinal opening;

(3) a metal washer (33) arranged concentrically about said threaded through bore on the side of said second synthetic washer remote from said fixed column member base portion; and (4) a fastening screw having a threaded portion extending through said washers and through said sleeve portion into threaded engagement with said threaded through bore, whereby the degree of tightening of said fastening screw in said threaded bore controls the magnitude of the functional resistance to the sliding displacement of said movable column member relative to said stationary column member.

12. A vehicle steering mechanism as defined in claim 9, wherein said first support member (5) is offset from said longitudinal opening.

13. A vehicle steering mechanism as defined in claim 1, wherein said wire first portion is bent to define a hook portion (47) that extends at least partially around said hitching post, the length of the opening in said book portion being greater than the dimension of said hitching post in the direction of said longitudinal slot, thereby to produce a predetermined delay between the initiation of vehicle impact ant the operation of said energy absorbing means.

14. A vehicle steering mechanism as defined in claim 1, wherein lack of said second support members includes a second cylinder (57), a synthetic sleeve (58) arranged around said roller, and means (59) fastening said cylinder to said fixed column member base plate; and further wherein said first fixed support member includes a first cylinder surrounded by a synthetic plastic sleeve (52), and a centering pin mounting said first cylinder on said fixed column member base plate relative to said longitudinal opening.

15. A vehicle steering mechanism as defined in claim 14, and further including a cover plate (12) having a base portion (63) parallel with and spaced from said fixed column member base portion, said cover plate covering said first support member and the adjacent portion of said wire; and a fastening screw (54) fastening said cover plate and said first fixed support to said fixed member base portion.

16. A vehicle steering mechanism as defined in claim 15, wherein said cover member includes a pair of orthogonally arranged side wall portions (61, 62) that extend downwardly adjacent the side walls of said fixed column member, respectively, and a friction element (66) mounted on one of said cover member side walls for frictional engagement within said wire.

17. A vehicle steering mechanism as defined in claim 1, wherein said force generating means comprises pyrotechnic force generating means.

* * * * *